(12) United States Patent
Colnot

(10) Patent No.: US 6,748,359 B1
(45) Date of Patent: Jun. 8, 2004

(54) METHOD FOR TRANSMITTING ACOUSTIC SIGNALS FROM A MEMORY OR CHIP CARD, AND CARD FOR IMPLEMENTING SAID METHOD

(75) Inventor: Cédric Colnot, Ivry-sur-Seine (FR)

(73) Assignee: Elva SA, Boulogne (FR)

( * ) Notice: Subject to any disclaimer, the term of this patent is extended or adjusted under 35 U.S.C. 154(b) by 0 days.

(21) Appl. No.: 09/530,587

(22) PCT Filed: Nov. 4, 1998

(86) PCT No.: PCT/FR98/02354

§ 371 (c)(1),
(2), (4) Date: May 5, 2000

(87) PCT Pub. No.: WO99/23804

PCT Pub. Date: May 14, 1999

(30) Foreign Application Priority Data

Nov. 5, 1997 (FR) .................................. 97 13902

(51) Int. Cl.[7] .............................................. H04R 17/00
(52) U.S. Cl. ....................................................... 704/270
(58) Field of Search ................. 704/270, 275, 704/260, 217; 379/88.01, 357.03, 355.08, 93.02, 93.03; 713/184, 186

(56) References Cited

U.S. PATENT DOCUMENTS

| | | | |
|---|---|---|---|
| 5,181,744 A | | 1/1993 | Betheil |
| 5,583,933 A | * | 12/1996 | Mark .......................... 379/355 |
| 5,745,555 A | * | 4/1998 | Mark ............................ 379/95 |
| 5,825,871 A | * | 10/1998 | Mark .......................... 379/355 |
| 5,905,476 A | * | 5/1999 | McLaughlin et al. .......... 345/1 |
| 6,292,158 B1 | * | 9/2001 | Amafuji et al. ................ 345/7 |

FOREIGN PATENT DOCUMENTS

| | | |
|---|---|---|
| EP | 0 618 711 | 10/1994 |
| GB | 2 272 130 | 5/1994 |
| WO | WO 97/16049 | 5/1997 |

* cited by examiner

Primary Examiner—Susan McFadden
(74) Attorney, Agent, or Firm—Oblon, Spivak, McClelland, Maier & Neustadt, P.C.

(57) ABSTRACT

A memory card or smart card for emitting sound signals. The card incorporates at least one controlling electronic micromodule which includes in particular processor circuits and a memory in which binary data is stored. An excitation device is connected to the micromodule to convert the binary data into sound signals. A vibrating membrane is connected to the excitation device to emit the sound signals. The vibrating mechanism is constituted by the card itself. Such a design is applicable in particular to transmitting binary data over a telephone line by acoustic coupling with a telephone.

20 Claims, 1 Drawing Sheet

METHOD FOR TRANSMITTING ACOUSTIC SIGNALS FROM A MEMORY OR CHIP CARD, AND CARD FOR IMPLEMENTING SAID METHOD

BACKGROUND OF THE INVENTION

1. Field of the Invention

The invention relates to a method of emitting sound signals from a memory card or a smart card.

2. Discussion of the Background

It is now common practice to use a memory card or a smart card as a key for giving access to a service or as means for transferring data. When this access or transfer is performed remotely, it is also known to use so-called "voice" cards where data is transmitted over a telephone line by acoustic coupling with a telephone.

A voice card is described in particular in document EP-A-0 664 633 where data is converted into sound signals by means of a piezoelectric transducer housed in the card, and those signals are emitted in voice form by the transducer and are transmitted to the telephone line via the microphone of the telephone. Emitting signals in "voice form" means emitting at any frequency lying in the passband of the telephone network.

Specifically, the user holds the telephone handset in one hand and the card in the other hand and brings the card up to the microphone of the handset, after which the user presses a key present on the card to activate the process of transmitting in voice form data that is recorded in the card.

Transmitting data in that way is not without its problems, in particular concerning manufacture of the card. The piezoelectric transducer must be received in a cavity that provides sufficient space to define an acoustic chamber. In spite of the small thickness of the card, 0.76 mm according to ISO standards, the dimensions of the cavity must nevertheless be sufficient to obtain good performance from the acoustic point of view, but that gives rise to a card that is fragile from the mechanical point of view. It is therefore necessary to find a compromise which becomes increasingly difficult to achieve with reducing card thickness. In addition, the acoustic chamber of the piezoelectric transducer must communicate with the outside via holes formed in the card. This means that the card is sensitive to constraints of the external environment, and in particular to moisture which can cause the piezoelectric transducer to misfunction.

SUMMARY OF THE INVENTION

Starting from in-depth examination of this state of the art, and seeking to mitigate specifically the problems posed by manufacture while complying with the thickness constraint imposed for this type of card, the Applicant has been led to design a new way of emitting sound which constitutes the subject matter of the present application.

To this end, the invention provides a method of emitting sound signals from a memory card or a smart card, the method being characterized in that it consists in using the card as a vibrating membrane, and in setting the card into vibration by means of an excitation device housed in the card for transforming it into a source that emits sound signals.

According to another characteristic of the invention, the method consists in using an excitation device which produces mechanical vibration, and in housing the source inside the card in such a manner as to secure it thereto so that the mechanical vibration produced by the excitation device is transmitted directly to the card to cause it to vibrate and cause it to emit sound signals.

Such a method of emitting sound signals presents the particular advantage of facilitating the operations of manufacturing the card. It is no longer necessary to provide an acoustic chamber in the cavity which receives the excitation device. This simplifies manufacture and also improves performance both acoustically and mechanically.

Thus, and in spite of appearing paradoxical, the small thickness which is a constraint in manufacturing a voice card of the prior art becomes an advantage in manufacturing a card that implements the method of the invention. In other words, the thinner the card, the better the performance of the method of the invention.

In addition, since the card is no longer pierced by holes which used to be necessary for passing the sound wave, the emission method of the invention can advantageously be implemented in a card which is waterproof.

In general, a voice card is activated using a mechanical key integrated in the card.

According to another characteristic of the invention, the emission method is activated from a touch-sensitive key, thereby making it easier to integrate such a key in a card of small thickness.

The invention also proposes a memory card or a smart card for implementing the emission method of the invention, the card incorporating at least one controlling electronic micromodule comprising in particular processor circuits and a memory in which binary data is stored, an excitation device connected to the micromodule to convert the binary data into sound signals, a vibrating membrane connected to the excitation device to emit said sound signals, and an actuation key, the card being characterized in that the vibrating membrane is constituted by the card itself.

By way of example, the excitation device of the membrane-forming card is a device which produces mechanical vibration, such as a ceramic type piezoelectric element, and which is secured to the card by being embedded therein, for example. In which case, the piezoelectric element and the card form an electro-acoustic transducer, the piezoelectric element being excited by electrical signals delivered on the basis of binary data recorded in the card, for example.

Preferably, the excitation device of the membrane-forming card is placed in a corner of the card while enabling the card to vibrate substantially over its entire area.

This position presents the particular advantage of displacing the excitation device away from the main twisting and bending axes of the card, thus also enabling the card to satisfy ISO standards concerning the mechanical stresses which the card must be capable of withstanding.

A card of the invention can be manufactured using conventional rolling or injection techniques, for example. To activate such a card, the user holds it between the fingers and activates the emission process by means of a key of the card, as with a conventional voice card. However, it is important to observe that the mere fact of the user holding the card between the fingers serves to amplify the vibration mode of the card.

According to another characteristic of the card of the invention, the activation key is constituted by a touch-sensitive key which, compared with a mechanical key, presents the advantage of having no moving parts.

Like the card of the document cited in the introduction, such a card can be used in particular for the purpose of emitting binary data in voice form for transmission over a telephone line by acoustic coupling with a telephone. Under such circumstances, the card of the invention has the advantage of not requiring accurate positioning relative to the microphone of the telephone.

BRIEF DESCRIPTION OF THE DRAWINGS

Other advantages, characteristics, and details of the invention appear from the description below given with reference to the accompanying drawing, given purely by way of example, and in which.

DESCRIPTION OF THE PREFERRED EMBODIMENTS

Figure 1:
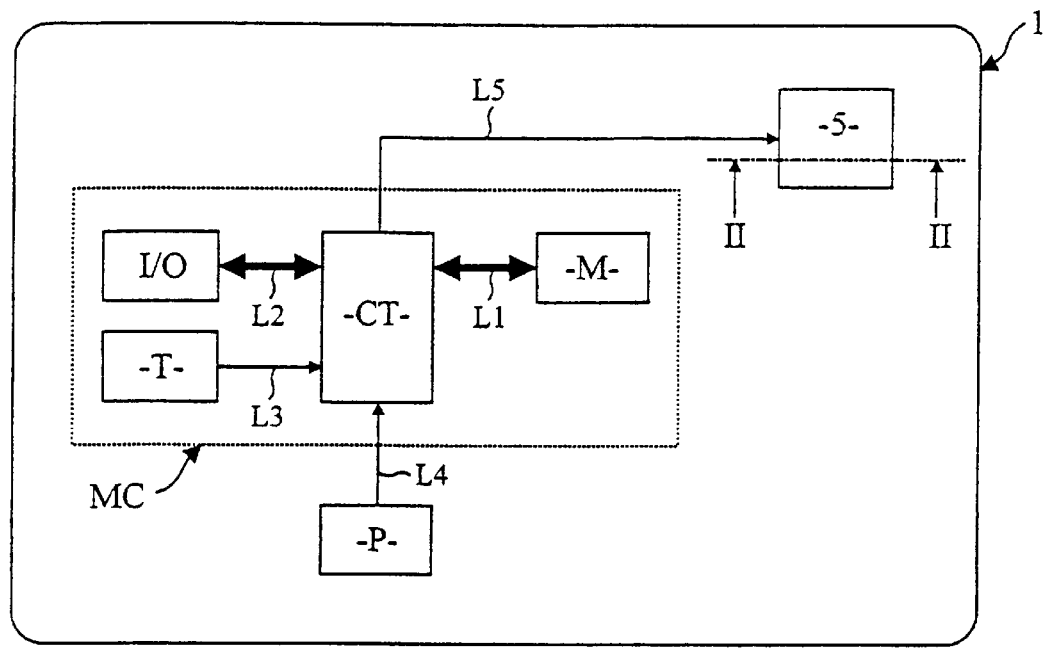
FIG. 1 is a diagrammatic view of a card implementing the emission method of the invention.

The memory card or smart card 1 shown in FIG. 1 incorporates at least one controlling electronic micromodule MC, a battery P, and an excitation device 5 designed to produce mechanical vibration.

The micromodule MC incorporates in particular a memory M of the EEPROM type, processor circuits CT, an input/output interface I/O having contacts, and an activation key T for setting the excitation device 5 into vibration. Two bidirectional electrical links L1 and L2 connect the memory M and the interface I/O respectively to the processor circuits CT, and a one-way electrical link L3 connects the key T to the processor circuits CT.

The battery P powers the processor circuits CT via an electrical link L4.

The excitation device 5 is designed to produce mechanical vibration which is transmitted directly to the card 1 so as to cause it to vibrate like a membrane. The excitation device 5 is connected via an electrical link L5 to the processor circuits CT of the micromodule MC.

The function of the processor circuits CT is to convert the binary information stored in the memory M into sound signals. By way of example, the binary information can be subjected to frequency shift keying (FSK) type modulation. This modulation consists in generating a carrier wave at a frequency that differs depending on the logic state of the bit to be transmitted.

Such a card 1 can be manufactured by a conventional rolling method which consists in making a "sandwich" comprising a plurality of sheets of plastics material that have been precut and that are stuck together so as to hold the various circuits of the card 1 captive between them.

Figure 2:
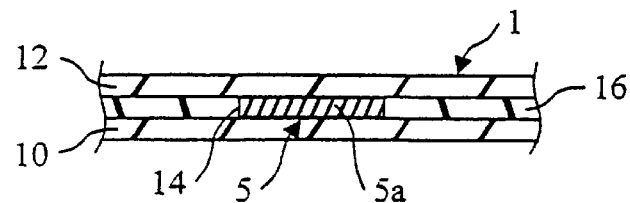
FIG. 2 is a fragmentary section view on line II—II of FIG. 1.

By way of example and with reference to FIG. 2, the excitation device 5 is constituted by a ceramic type piezoelectric element 5a which is sandwiched between two sheets 10 and 12 of plastics material that are stuck together. Specifically, the piezoelectric element 5a is received in an opening 14 formed in an intermediate sheet 16 of plastics material. This opening 14 passes right through the sheet 16 and has dimensions that match those of the piezoelectric element 5a. Once the sheets 10, 12, and 16 have been assembled together with adhesive, the two faces of the piezoelectric element 5a are in contact respectively with the two sheets 10 and 12, such that the piezoelectric element 5a is thus mechanically secured to the card 1.

Advantageously, the excitation device 5 is positioned in a corner of the card 1 for the reasons explained above.

Figure 3:
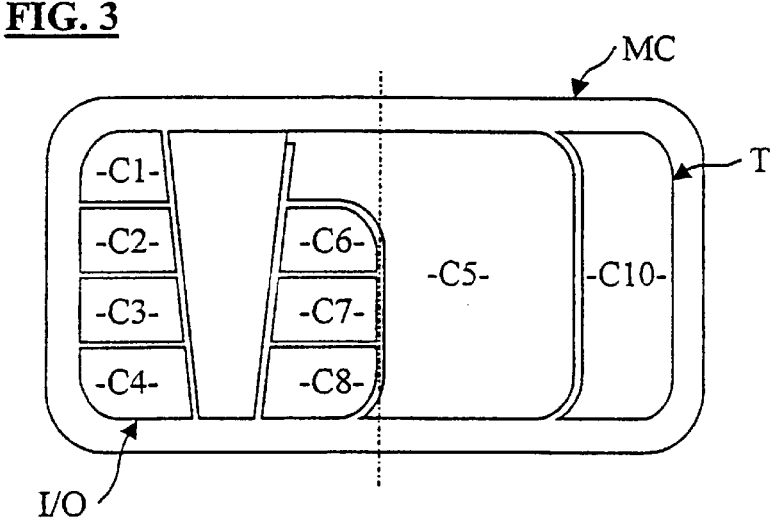
FIG. 3 is a plan view of the controlling electronic micromodule integrated in the card.

In a preferred embodiment of the card 1, the activation key T is constituted by a touch-sensitive key. More precisely, and with reference to FIG. 3, the input/output interface I/O is constituted by the eight electrical contacts referenced C1 to C8 in application of the ISO standards, which contacts are flush with one of the faces of the card 1 and selectively connected to the micromodule MC. The touch-sensitive key T is constituted by an additional electrical contact C10 which is flush with the same face of the card 1 and which is located in the immediate vicinity of the interface I/O. More precisely, the electrical contact C10 is situated close to electrical contact C5 which covers a larger area than the other electrical contacts. The electrical contact C10 is connected to the micromodule MC in such a manner that it suffices to press a finger, generally the thumb, simultaneously on the contact C5 for the interface I/O and on the contact C10 of the key T in order to establish an electrical link which activates the micromodule MC.

This key T may advantageously be associated with a circuit for validating activation of the card so as to avoid untimely operation in the event of a finger touching the key, both during manufacturing operations and while the card is being handled by its user. Specifically, such a validation circuit is incorporated in the micromodule MC and serves to detect voluntary action on the part of the user on the key T prior to activating operation of the card.

Specifically, we consider an application in which the card 1 is used as a conventional voice card for emitting and transmitting sound signals over a telephone line by acoustic coupling with the microphone of a telephone. The emitted sound signals correspond, for example, to a binary data sequence that is prerecorded in the memory of the card and which serves to identify the user.

The user takes hold of the card 1 between fingers pressed respectively against both of the main faces of the card 1, one of the user's fingers making electrical contact between the contact C5 of the input/output interface I/O and the contact C10 of the key T once the card 1 has been positioned physically close to the microphone of the telephone.

The emission process is then activated. In other words, the processor circuits CT convert the binary data sequence taken from the memory M into a sequence of sound signals which are applied to the excitation device 5. These sound signals serve to put the excitation device 5 into vibration, and the resulting vibrations are transmitted directly to the card 1 which sets itself into vibration like a conventional membrane. The vibration mode of the card 1 is improved when the user holds the card between the fingers. The card 1 is thus transformed into a source that emits a sound wave representative of the binary data sequence taken from the memory M of the card 1. This sound wave is then transmitted over the telephone line via the microphone of the telephone.

A server connected to the telephone network thus receives a binary data sequence and can then trigger a unidirectional or bidirectional identification protocol for identifying the received sequence and for giving the user access to a service provided by the server.

Naturally, such a voice card can be used as a conventional memory card or smart card by being inserted in a reader which communicates therewith via the input/output interface I/O.

What is claimed is:

1. A method of emitting acoustic waves from a memory card or a smart card, said card comprising a plurality of precut plastic sheets stacked and affixed so as to hold at least an electro-acoustic transducer having an excitation device, the method comprising the steps of:

producing mechanical vibration using the excitation device; and transmitting the mechanical vibration directly to the card, thereby causing the card to vibrate and emit the acoustic waves.

2. The method according to claim 1, wherein the acoustic waves emitted by the card are transmitted over a telephone line, by acoustic coupling of the card with a telephone, for remote transmission of binary data recorded in a memory of the card.

3. The method according to claim 1, wherein the emission method is activated by a touch-sensitive key provided on the card.

4. The method according to claim 1, wherein the electro-acoustic transducer is excited by electrical signals delivered from binary signals stored in the card.

5. A card for implementing the method according to claim 1, wherein the card includes a controlling electronic micromodule having processor circuits and a memory in which binary data is stored, and wherein the excitation device is connected to the micromodule to convert the binary data into acoustic waves.

6. The card according to claim 5, wherein the excitation device comprises a piezoelectric ceramic element.

7. The card according to claim 6, further comprising a key situated on the card and connected to the micromodule, said key being a touch-sensitive key to activate a transmission process.

8. The card according to claim 7, wherein the touch-sensitive key comprises a first electrical contact which is flush with a face of the card, wherein the card has a second electrical contact of an input/output interface, the second electrical contact being selectively connected to the controlling micromodule, and wherein the first electrical contact of the key is positioned close to the second electrical contact of the card in such a manner as to enable a finger of the hand to press simultaneously against both the first and second electrical contacts to activate the control module.

9. The card according to claim 5, wherein the excitation device is positioned in a corner of the card.

10. A method of emitting acoustic waves from a memory card or a smart card, said card comprising a plurality of precut plastic sheets stacked and affixed so as to hold at least an electro-acoustic transducer having means for vibrating, the method comprising the steps of:

producing the mechanical vibration using the means for vibrating;

transmitting the mechanical vibration directly to the card, thereby causing the card to vibrate and emit the acoustic waves, and wherein the means for vibrating does not include an acoustic chamber.

11. The method according to claim 10, wherein the emission method is activated by a touch-sensitive key provided on the card.

12. The method according to claim 10, wherein the electro-acoustic transducer is excited by electrical signals delivered from binary signals stored in the card.

13. The method according to claim 10, wherein the acoustic waves emitted by the card are transmitted over a telephone line, by acoustic coupling of the card with a telephone, for remote transmission of binary data recorded in memory of the card.

14. A card for implementing the method according to claim 10, wherein the card includes a controlling electronic micromodule having processor circuits and a memory in which binary data is stored, and wherein means for vibrating is connected to the micromodule to convert the binary data into acoustic waves.

15. The card according to claim 14, wherein the means for vibrating comprises a piezoelectric ceramic element.

16. The card according to claim 15, further comprising a key situated on the card and connected to the micromodule, said key being a touch-sensitive key to activate a transmission process.

17. The card according to claim 16, wherein the touch-sensitive key comprises a first electrical contact which is flush with a face of the card, wherein the card has a second electrical contact of an input/output interface, the second electrical contact being selectively connected to the controlling micromodule, and wherein in the first electrical contact of the key is positioned close to the second electrical contact of the card in such a manner as to enable a finger of the hand to press simultaneously against both the first and second electrical contacts to activate the control module.

18. The card according to claim 14, wherein the means for vibrating is positioned in a corner of the card.

19. A memory card or a smart card for emitting acoustic waves, comprising:

an electro-acoustic transducer having an excitation device for producing mechanical vibration; and a plurality of precut plastic sheets stacked and affixed so as to enclose at least the electro-acoustic transducer, the plurality of precut plastic sheets including a top sheet and a bottom sheet, and including an intermediate sheet having an opening with dimensions matching those of the excitation device, wherein the excitation device is secured to the card by arranging the excitation device within the opening of the intermediate sheet and by sandwiching the excitation device between the top and bottom sheets, and wherein the mechanical vibration from the excitation device is directly transmitted to the sheets, thereby causing the card to vibrate and emit the acoustic waves.

20. The memory card or smart card of claim 19, wherein the excitation device comprises a ceramic piezoelectric element.

\* \* \* \* \*